July 2, 1940.      H. S. OGDEN      2,206,706
CONTROL SYSTEM
Filed May 13, 1939
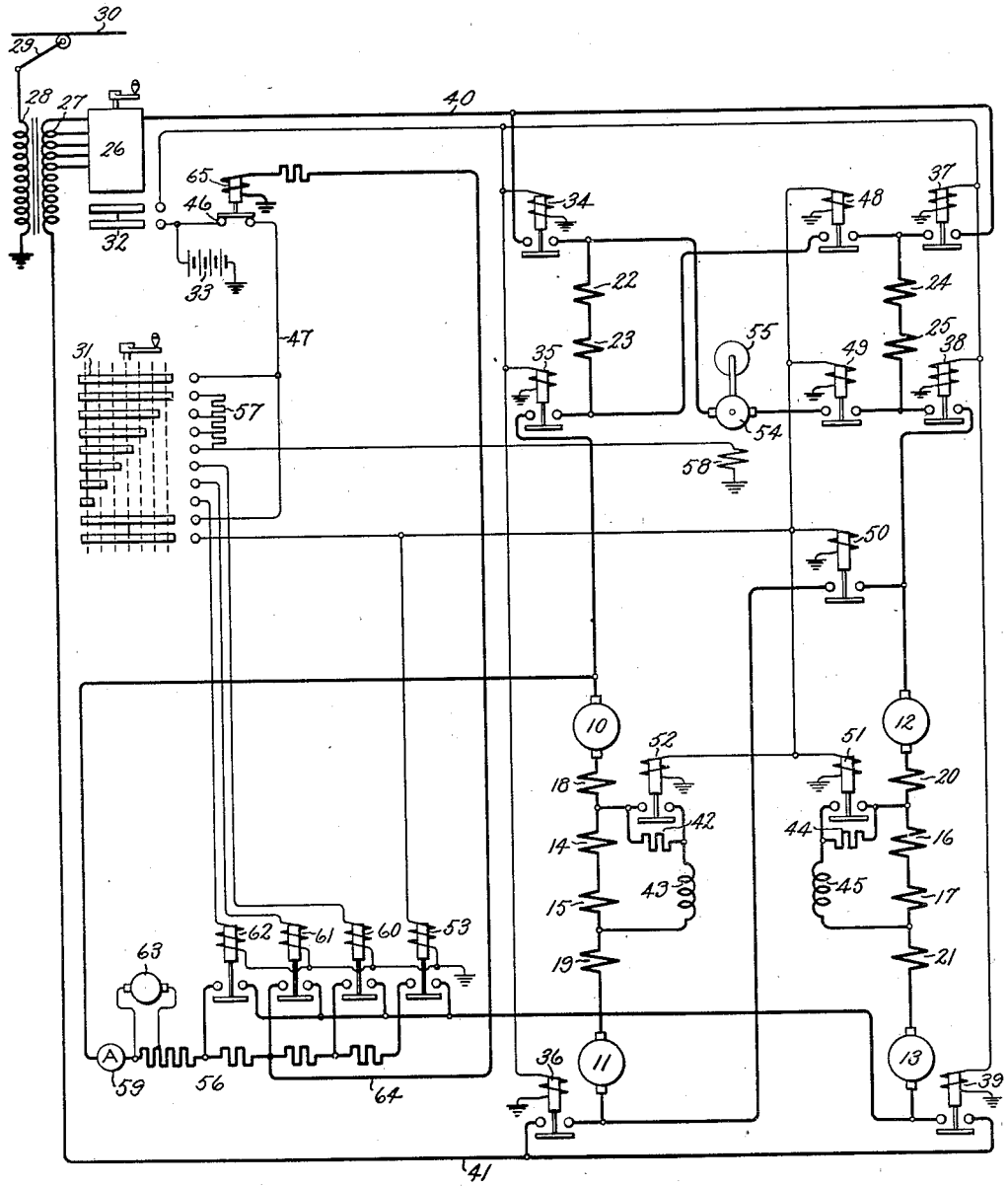
Inventor:
Harold S. Ogden,
by Harry E. Dunham
His Attorney.

Patented July 2, 1940

2,206,706

UNITED STATES PATENT OFFICE 2,206,706

CONTROL SYSTEM

Harold S. Ogden, Erie, Pa., assignor to General Electric Company, a corporation of New York Application May 13, 1939, Serial No. 273,487

6 Claims. (Cl. 172—179)

My invention relates to control systems, more particularly to control systems for series alternating current motors such as used on electric vehicles, and has for its object a simple and reliable dynamic braking system for such motors.

In carrying out my invention in one form, I connect the exciting fields of the motors in a separate circuit with an exciting generator which excites the fields with direct current while the armatures of the motors are connected across a dynamic braking resistance.

For a more complete understanding of my invention, reference should be had to the accompanying drawing, the single figure of which shows in diagrammatic form a system of control for an electric locomotive embodying my invention.

Referring to the drawing, I have shown my invention in one form as applied to an electrically driven railway locomotive provided with four traction motors having armatures 10, 11, 12 and 13, interpole field windings 14, 15, 16 and 17, commutating field windings 18, 19, 20 and 21 and exciting field windings 22, 23, 24 and 25. By means of a suitable rotatable controller 26, which may be a drum controller or a cam type controller, varying alternating current voltages from taps on the secondary winding 27 are applied to the motors during motoring operation. The secondary winding 27 has a primary winding 28 connected by a trolley 29 to a suitable trolley wire 30 supplied with alternating current of suitable voltage. For the dynamic braking connections, a separate controller 31 is used, this controller during motoring operation being in the off-position shown in the drawing.

For motoring, when the controller 26 is turned to a running position, the bridging contact 32 closes a control circuit from a suitable source, such as a battery 33, through the operating coils 34, 35, 36, 37, 38 and 39 to ground whereby the switches or contactors operated by these coils are closed. This connects the motor armatures in two parallel circuits between the supply conductor 40 leading from the controller 26 and the supply conductor 41 connected to the lower end of the secondary winding 27, one parallel circuit including the armatures 10 and 11 and their field windings while the other parallel circuit includes the armatures 12 and 13 and their field windings. At this time, the interpole field windings 14 and 15 are shunted by the resistance 42 and reactance 43 connected in series with each other, while the interpole field windings 16 and 17 have a similar shunt consisting of a resistance 44, and a reactance 45.

When dynamic braking is desired, the controller 26 is thrown to the off-position and the braking controller 31 is turned to an on-position, it being assumed that it is turned at this time to the first position only. This closes a circuit through the two lower segments of the controller leading from one side of the battery 33 through the normally closed cut-out switch 46, conductor 47, the two lower segments of the controller 31 and thence to the operating coils 48, 49, 50, 51, 52 and 53 in parallel to ground. The contactors operated by these coils are thereupon closed whereby the exciting field windings 22 to 25 inclusive are connected in series with each other across an exciting generator 54. This generator is driven by a suitable alternating current electric motor 55 connected suitably to the trolley 30 as by a separate transformer (not shown) so as to operate at a substantially constant speed.

Also the contactors operated by the coils 53 and 50 connect the four armatures with their interpole and commutating field windings in series with each other across a dynamic braking resistor 56. Moreover, the two upper segments of the controller 31, complete a circuit from the conductor 47 through a field resistance 57 and the field winding 58 of the exciter 54 to ground. The contactors operated by the coils 51 and 52 short circuit the interpole shunt resistance 42 and 44 leaving the interpole field windings shunted only by the reactors 43 and 45.

The motors now operate as generators, their fields being excited with direct current, and supply braking current to the dynamic braking resistor 56. Preferably, an ammeter 59 is provided whereby the operator can note the amount of the braking current and operate the braking controller in accordance therewith.

In order to increase the dynamic braking action, or hold it constant as the speed of the locomotive decreases and the voltage of the motors acting as generators drops, the braking controller 31 is advanced. This first short circuits in three steps the field resistance 57 whereby the excitation of the field winding 58 is increased to increase the voltage of the exciter 54 and thereby increase the excitation of the exciting field windings. From then on, after the excitation of the field windings has been thus increased to a maximum, the controller 31 energizes in sequence, as named, the operating coils 60, 61 and 62 which close contactors to short circuit and thereby disable sections of the braking resistor 56. It will be understood that this control of the braking by successively decreasing the field resistance of the exciting generator and the braking resistance may be carried out in some other sequence than that described.

Preferably, the braking resistance 56 is cooled by a suitable blower or fan (not shown) driven by an electric motor 63 which is connected for energization across a section of the braking resistor which is not short circuited so that the motor 63 operates to drive the blower as long as dynamic braking is continued.

To reduce the voltage with respect to ground, an intermediate point of the braking resistor is connected through a conductor 64 and a relay coil 65 to ground. In the event of a failure of the insulation causing a ground in another part of the system, the resulting current through the conductor 64 opens the cut-out switch 46 and thereby deenergizes and opens the field and braking connections thus disabling the braking controller.

While I have shown a particular embodiment of my invention, it will be understood, of course, that I do not wish to be limited thereto, since many modifications may be made and I, therefore, contemplate by the appended claims to cover any such modifications as fall within the true spirit and scope of my invention.

What I claim as new and desire to secure by Letters Patent of the United States, is:

1. A braking control system for a vehicle provided with an alternating current series excited driving motor having an armature and an exciting field winding, comprising control means for supplying an alternating voltage of selected value to said motor for motoring operation, means for supplying direct current, a dynamic braking resistor, a braking controller movable to connect said exciting field winding in a separate circuit to said direct current supply means and connect said armature to said braking resistor for dynamic braking, and means operated by said braking controller for thereafter increasing the excitation of said field winding and disabling a portion of said braking resistor.

2. A braking control system for a vehicle provided with an alternating current series excited driving motor having an armature and an exciting field winding, comprising control means for supplying an alternating voltage of selected value to said motor for motoring operation, a generator for supplying direct current, a dynamic braking resistor, a braking controller movable to connect said exciting field winding in a separate circuit to said generator and connect said armature to said braking resistor for dynamic braking, and means operated by said braking controller for controlling said generator to vary the excitation of said field winding and for disabling a portion of said braking resistor.

3. A braking control system for a vehicle provided with a plurality of alternating current series excited driving motors, each having an armature and an exciting field winding, comprising control means for supplying an alternating voltage of selected value to said motors for motoring operation, a direct current exciting generator provided with a field winding, a dynamic braking resistor, a braking controller movable to connect said exciting field windings in a separate circuit to said generator and to connect said armatures to said braking resistor for dynamic braking, and means operated by said braking controller for thereafter increasing the excitation of said field windings and disabling a portion of said braking resistor.

4. A braking control system for a vehicle provided with a plurality of alternating current series excited driving motors, each having an armature and a series exciting field winding, comprising a controller rotatable to supply an alternating voltage of selected value to said motors for motoring operation, a direct current exciting generator provided with a field winding, a separate motor for driving said generator, a dynamic braking resistor, a braking controller rotatable to connect said exciting field windings in series with each other in a separate circuit to said generator and to connect said armatures in series with each other to said braking resistor for dynamic braking, and means operated by said braking controller for thereafter increasing the excitation of said field windings and disabling a portion of said braking resistor.

5. A braking control system for a vehicle provided with an alternating current series excited driving motor having an armature and an exciting field winding, comprising control means for supplying an alternating voltage of selected value to said motor for motoring operation, means for supplying direct current, a dynamic braking resistor, a braking controller movable to connect said exciting field winding in a separate circuit to said direct current supply means and connect said armature to said braking resistor for dynamic braking, a ground connection for said braking resistor, and means responsive to current in said ground connection for disabling said braking controller.

6. A braking control system for a vehicle provided with a plurality of alternating current series excited driving motors, each having an armature and an exciting field winding, comprising control means for supplying an alternating voltage of selected value to said motors for motoring operation, a direct current exciting generator provided with a field winding, a dynamic braking resistor, a braking controller movable to connect said exciting field windings in a separate circuit to said generator and to connect said armatures to said braking resistor for dynamic braking, means operated by said braking controller for thereafter increasing the excitation of said field windings and disabling a portion of said braking resistor, a ground connection for said braking resistor, and means responsive to current in said ground connection for disabling said braking controller.

HAROLD S. OGDEN.